United States Patent [19]
Deefholts et al.

[11] Patent Number: 5,626,219
[45] Date of Patent: May 6, 1997

[54] APPARATUS AND METHOD FOR STABILISING MATERIAL TRANSPORTED ON CONVEYOR BELTS

[75] Inventors: Benedict M. M. Deefholts, London; Robert J. Harris, Wickford, both of England

[73] Assignee: Sortex Limited, London, England

[21] Appl. No.: 335,911

[22] Filed: Nov. 8, 1994

[51] Int. Cl.[6] ................................................. B65G 15/14
[52] U.S. Cl. ......................... 198/626.5; 198/626.6; 198/836.2; 198/835; 198/620
[58] Field of Search ......................... 198/626.5, 626.6, 198/836.2, 835, 620; 209/576–577, 580–581, 587, 638, 639

[56] References Cited

U.S. PATENT DOCUMENTS

| | | | |
|---|---|---|---|
| 1,987,231 | 1/1935 | Engel | 198/626.6 X |
| 3,372,655 | 3/1968 | Williams | 198/626.6 X |
| 4,203,513 | 5/1980 | Scheppele | 198/620 |
| 4,203,522 | 5/1980 | Fraenkel et al. . | |
| 4,406,359 | 9/1983 | Cole et al. . | |
| 4,513,868 | 4/1985 | Culling et al. . | |
| 4,534,183 | 8/1985 | Hashimoto et al. | 198/626.6 X |
| 4,699,273 | 10/1987 | Suggi-Liverani et al. . | |
| 4,830,180 | 5/1989 | Ferguson et al. . | |
| 5,048,674 | 9/1991 | Wilbur et al. | 198/836.2 |
| 5,123,261 | 6/1992 | Cope . | |

FOREIGN PATENT DOCUMENTS

| | | | |
|---|---|---|---|
| 1233058 | 10/1960 | France | 198/626.6 |
| 1223753 | 8/1966 | Germany | 198/836.2 |
| 591080 | 8/1947 | United Kingdom | 198/626.5 |
| 2017034 | 9/1979 | United Kingdom . | |

*Primary Examiner*—Boris Milef
*Attorney, Agent, or Firm*—Majestic, Parsons, Siebert & Hsue

[57] ABSTRACT

A stabilizer unit for material on a moving conveyer surface comprises a framework mounted over the surface with a drive pulley making driving engagement therewith. A drum is rotatably supported in the framework and carries a stabilizer surface thereon. The drive pulley is coupled to the drum to rotate the drum with its peripheral velocity substantially equal to that of the drive pulley, thus imparting the corresponding velocity to the stabilizer surface. The stabilizer surface can be a belt loosely carried on the drum, which follows a path with a first section overlaying the conveyer surface, a second section in engagement with a segment of the drum surface, and third and fourth sections extending between the drum surface and the respective points of separation of the stabilizer belt from the conveyer surface. Movement of the conveyer surface rotates the drive pulley and thereby the drum to advance the stabilizer belt around its path at a speed equal to the speed of the conveyer surface. With no substantial relative movement therebetween, the stabilizer belt and the conveyer surface stabilize material held therebetween along the first section of the stabilizer belt path.

24 Claims, 3 Drawing Sheets

APPARATUS AND METHOD FOR STABILISING MATERIAL TRANSPORTED ON CONVEYOR BELTS

BACKGROUND TO THE INVENTION

This invention relates to the stabilisation of material on moving conveyor surfaces, and particularly to a stabiliser unit for this purpose. It has especial application to sorting apparatus in which bulk material of relatively light specific weight is carried at speed along a conveyor to a sorting station where defective or rejected elements thereof are removed while the material is in free flight.

Where bulk material is to be transported on a conveyor belt at speed, upon delivery of the material to the belt it is subject to significant acceleration. This results in movement of the material on the conveyor and significant instability. While chutes or intermediate conveyor belts can be used to accelerate the material as it is delivered to the conveyor belt, it is not always possible to include a chute, and when the material is frozen or moist, chutes can be of limited use. While reference is made herein to conveyor belts, similar problems arise in the use of other conveyor surfaces, such as the peripheral surface of a rotating drum.

In the recognition that unstable material on a moving conveyor can create problems, various attempts have been made to provide an effective means by which such material can be stabilised. Soft rollers have been used, with the surface provided by foam or an airbag, but these have lead to some difficulties because the rollers were driven at least partly by contact with the material itself on the conveyor surface. In another proposal, a flexible open mesh is provided on a cylindrical surface mounted by a resilient core to a rotatable shaft. The shaft is rotated by a drive wheel on the shaft which engages the conveyer surface. Such a stabiliser is disclosed in U.S. Pat. No 4,830,180. While the use of a drive wheel to rebate the shaft reduces the demands on the surface contacting material on the conveyer, the downward force applied by the mesh to articles on the conveyer is essentially determined by the construction of the stabiliser. Thus, the stabilising material cannot be moved away from the conveyer, other than by contact with articles on the conveyer, without simultaneous removal of the drive wheel.

SUMMARY OF THE INVENTION

The present invention is directed at a stabiliser unit in which a stabiliser surface carried on a drum is driven at a speed substantially equal to the advance of a conveyer surface where it overlays the conveyer surface, to stabilise material thereon. The drum is rotatably mounted in a framework, and driven by a drive pulley adapted to engage the moving conveyor surface and transmit drive therefrom to the drum via a coupling which ensures the peripheral velocity of the drive pulley and the drum is substantially the same, thereby avoiding substantial relative movement of the stabiliser belt and conveyer surface in the section of the stabiliser belt path which overlays the conveyer surface. The coupling is normally a reversing pulley interposed between the drive pulley and the drum. The conveyer surface is normally the surface of a conveyer belt, but it might take another form, such as the surface of a rotating cylinder. Where the surface is on a rotating cylinder, a stabiliser unit of the invention can be of particular value as there would be less time available for material delivered to the surface to stabilise naturally.

The stabilising surface on the drum can be a relatively thick layer of soft but resilient material, such as foam rubber, normally held spaced from the conveyor surface. However, an inflated bag, or a web or mesh, of the kind referred to above might be used to define the operative surface of the drum. The preferred stabilising surface in units of the invention is a stabiliser belt which extend round a drum suspended in a framework over the conveyor surface, and has sufficient length that it moves in a path comprising four primary sections. These are a first section overlaying the conveyor surface; a second section in engagement with a segment of the drum, and third and fourth section extending between the drum surface and respective points of separation of the stabiliser belt from the conveyor surface. A gripping, roller or other means can be included to hold the stabiliser belt against the drum as it is driven thereby ensuring the synchronous movement of the stabiliser belt and the conveyor surface in the overlaying section.

In a stabiliser unit according to the invention the drum will normally be of sufficient length to cover substantially the entire width of the conveyor surface with which it is to be used. However, as the drive for the unit is to be transmitted from the conveyor surface itself via the drive pulley and the respective coupling means, these components are disposed at the axial extremities of the drum, normally outside of a pair of flanges between which the stabiliser surface is carried.

The drum in stabiliser units according to the invention is preferably mounted in the framework so that it can readily be removed to enable the cleaning of the stabiliser surface. The drum may be mounted on a fixed rotational axis in the framework; for example, with an axle of the drum being received in appropriate slots providing for easy removal. When the stabiliser surface is a loose belt, once the drum is removed, the belt and drum can be readily separated, enabling the stabiliser belt to be replaced and the drum returned to its operative position in the unit in a very short changeover time. In an alternative arrangement, which renders the drum and belt no less easily removable, the drum is supported on either side of its rotational axis by pulleys or rollers, of which those on one side of the axis may constitute part of the drum drive mechanism. On the other side, idler rollers would be mounted in the framework. In this arrangement the actual location of the drum axis can be altered by movement of the supporting rollers, and particularly those which comprise the coupling means between the drive pulley and the drum.

The invention will now be described by way of example, and with reference to the accompanying schematic drawings.

DESCRIPTION OF THE PREFERRED EMBODIMENT

Figure 1:
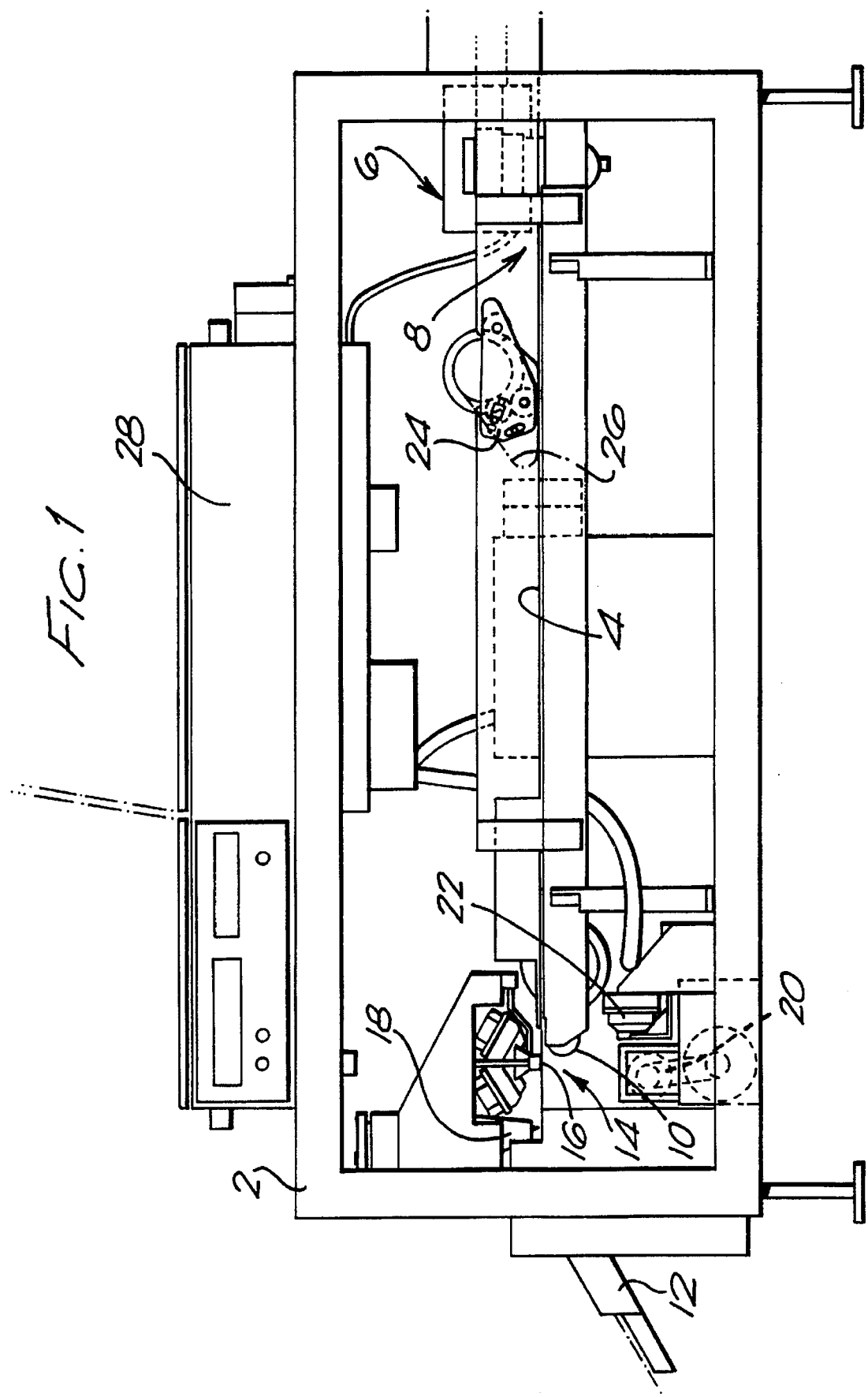
FIG. 1 shows in side elevation sorting apparatus including a stabiliser unit embodying the present invention.

The sorting apparatus shown in FIG. 1 is designed to handle particulate bulk material including moist or frozen produce even when this has a tendency to agglomerate. The apparatus is assembled around a support structure 2 in which a conveyor belt 4 extends nearly the full length thereof. The belt 4 is around 20 inches wide, and carries the material a distance of approximately 50 inches. The material of the conveyer surface will normally be textured. A number of surface patterns can be used, such as dimples and saw-tooth, the latter preferably with the teeth inclined in the direction of travel.

Bulk material is fed to the conveyer 4 from a delivery mechanism such as a vibratory feeder 6 which agitates and breaks up agglomerated material prior to discharging it onto the conveyor belt at delivery section 8. The conveyer belt 4 moves at a speed, to the left as shown, sufficient to project the material from the downstream end 10 thereof in a free trajectory to a chute 12 from which it is delivered to a suitable collection receptacle (not shown). The product is sorted just as it leaves the end 10 of the conveyer, where it passes through a scanning zone 14 in which it is illuminated and scanned for light reflected from particles in the product stream through a gap 16 using arrays of detectors mounted in a computer housing 28 on the support structure 2. Two arrays are used, each monitoring around 10 inches of the product stream width. In order to provide a background against which the reflected light is monitored, a rotating roller 20 is illuminated by a light source 22, which light is reflected off the roller surface into the scanning zone 14.

Downstream from the scanning zone 14 is disposed an array 18 of ejectors which are activated in response to signals from the scanning system to eject by pneumatic means a product in the stream which has been deemed unacceptable as a consequence of analysis of light reflected therefrom in the scanning zone 14. Typically, there are forty ejectors arranged across the product stream width at half inch spacings. The ejectors discharge unacceptable product downwards out of the product stream, into a suitable receptacle (not shown). The operation of the apparatus shown in FIG. 1 is controlled by a computer in the housing 28.

These scanning and ejector mechanisms can be of any suitable kind commonly used in colour sorting apparatus. Suitable sorting techniques using optical scanning systems and pneumatic ejection systems as described herein are more fully disclosed in U.S. Pat. Nos. 4,203,522; 4,513,868 and 4,699,273, the disclosures whereof are hereby incorporated by reference.

Material leaving the vibratory feeder 6 will normally have only a small linear speed, typically around ½ meter per second, and must be rapidly accelerated to reach a speed sufficient to project the product into the trajectory described above. A typical linear conveyor speed for this purpose is around 3 meters per second. This acceleration, as the material transfers from the feeder 6 to the conveyor belt 4, leads to a relatively unstable product on the conveyor.

In order to stabilise material on the conveyor between the delivery section 8 and the discharge end 14 of the conveyor, a stabiliser unit comprising a framework 24 is mounted over the conveyor belt 4. The unit includes a belt 26 which overlays a section of the conveyor belt path, and moves with the conveyor belt over this section, to hold material against the conveyor belt, stopping movement thereof, with the result that downstream of the stabiliser unit material on the conveyor belt 4 is substantially stationary relative to the conveyor belt.

Figure 2:
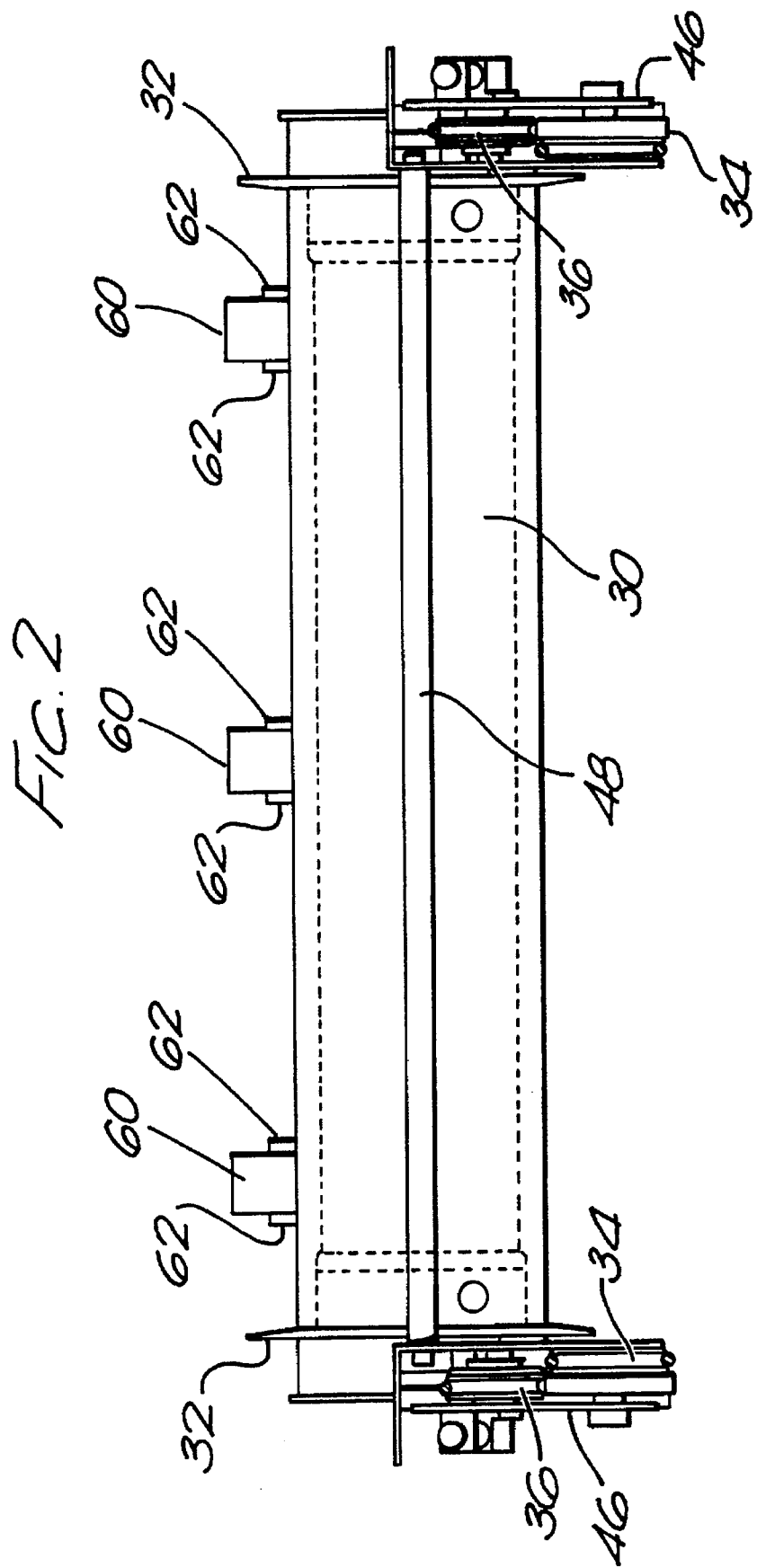
FIG. 2 is an enlarged end view, partly in section, of the stabiliser unit shown in FIG. 1, but omitting the belt.

FIG. 2 shows a front elevation of the stabiliser unit in FIG. 1 and as can be seen, the framework 24 supports a drum 30 for carrying the stabiliser belt 26 (not shown in this Figure) between two flanges 32. At either end of the drum, outside of the flanges 32, a simple gear train is mounted on the framework 24, which has the effect of driving the periphery of the drum 30 at substantially the same speed and in the same direction as the conveyor belt 4 over which it is disposed. This gear train comprises a drive pulley 34 for driving engagement with the conveyor belt 4, and a reversing pulley 36 which couples the periphery of the pulley 34 to the periphery of the drum 30. The operation of the stabiliser unit will now be described in more detail with reference to FIG. 3.

Figure 3:
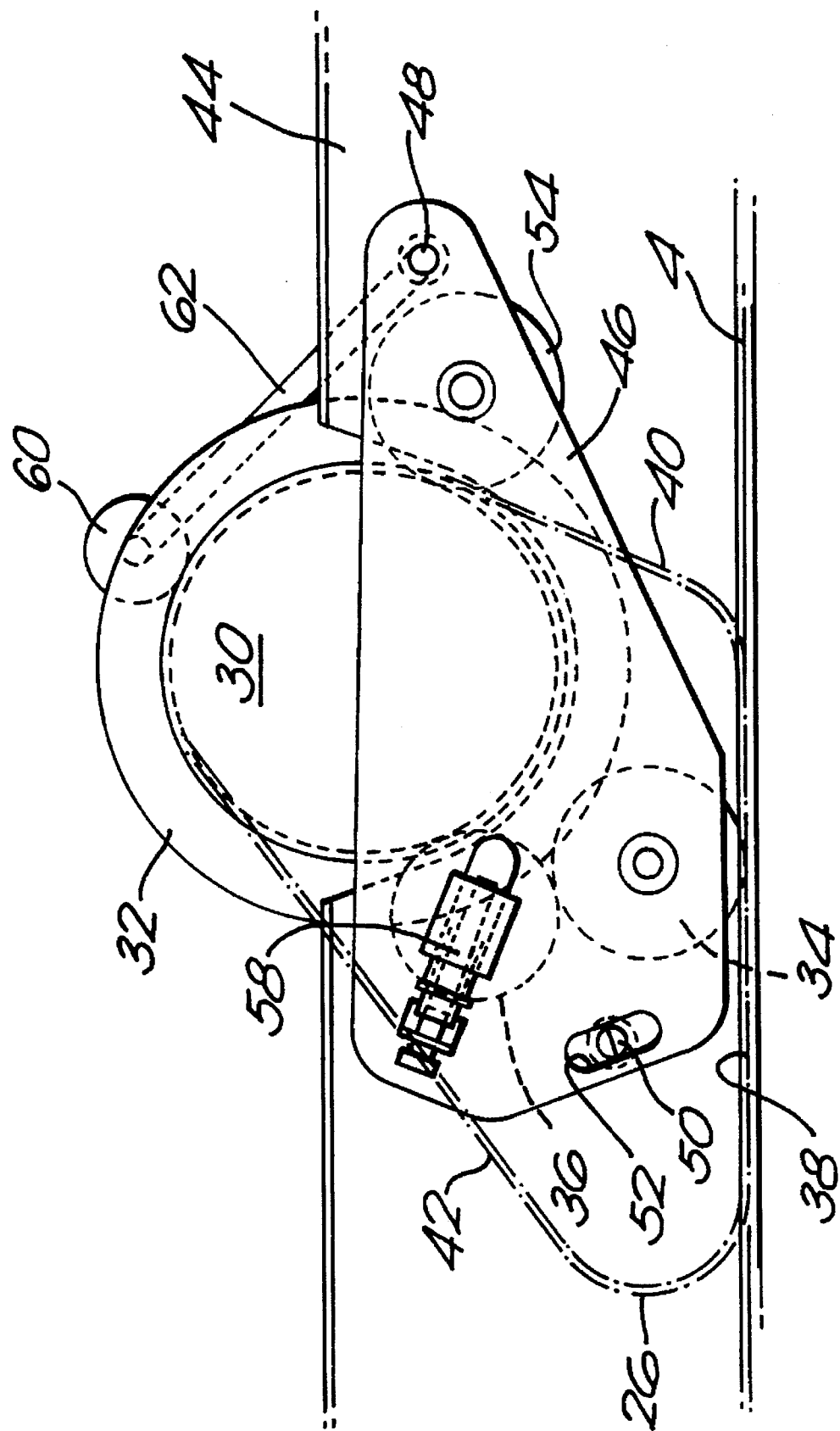
FIG. 3 is an enlarged outline elevation of the stabiliser unit of FIGS. 1 and 2, showing the interrelation between the drum and the pulleys, and the means by which the unit itself can be mounted in a sorting device of the kind shown in FIG. 1.

The stabiliser belt 26 is only loosely carried on the drum 30, and rests by virtue of its own weight on the conveyor belt 4. FIG. 3 illustrates a situation in which the conveyor belt 4 is in motion, to the left as shown, thus drawing the stabiliser belt 26 with it. The stabiliser belt is normally composed of food quality approved inert material such as silicon rubber, of sufficient thickness and flexibility to stabilise product on the belt.

In order to ensure that the stabiliser belt 30 is driven at a speed substantially the same as that of the conveyor belt 4, the movement of the conveyor belt 4 is coupled directly to the periphery of the drum 30 via two pulleys 34 and 36. The periphery of drive pulley 34 makes direct contact with the conveyor belt 4 and thus, the periphery of the reversing pulley 36 also moves at the same speed as the conveyor belt 4. This movement is imparted to the peripheral surface of the drum 30, with the result that the periphery of the drum 30 will move in synchronism with the conveyor belt 4.

The design of stabiliser units according to the invention provides for the velocities of the conveyor surface and that of the stabiliser surface or belt to be substantially equal. However, within this term a degree of inequality is permissible. For example for some products there could be some benefit in controlling the stabiliser surface to move slightly more slowly than the conveyor surface so that the stabiliser surface has a slight dragging effect. This can be of especial use where particles of the product have agglomerated.

As noted above, the stabiliser belt 26 is carried only loosely on the drum 30. This enables its length at any particular instant in its use as described herein to be divided into four discrete sections. A first section 38 is substantially flat, and directly overlays a corresponding section of the conveyor belt 4. A second section is in engagement with a segment of the drum surface which drives it, and third and fourth sections 40 and 42 are defined between the drum surface and the respective points of convergence and separation of the stabiliser belt 26 and the conveyor belt 4. The length of the linear section 38 is not normally critical, and this arrangement of the stabiliser belt on the drum 30 thus enables the drum to be operationally raised or lowered relative to the conveyor belt 4 as desired within tolerable limits. The spacing of the drum 30 over the conveyor belt 4 can be set relative to the dimensions of the material being stabilised. A typical spacing could be around one inch for material to be stabilised having a mean diameter of say ¼ inch, for example frozen peas. However, the stabiliser unit can be equally effective with the drum at a much greater spacing over the belt than the size of the material on the belt requires. In some circumstances such a greater spacing is especially useful if agglomerated particles are to be broken up with minimal damage.

The stabiliser unit illustrated is designed with a mechanism for altering the spacing between the framework 24 and the conveyor belt 4, and thereby adjust the pressure between the drive pulley 34 and the belt 4. On either side of the conveyor belt 4 there is a fixed rail 44. In order to accommodate the stabiliser unit, a section of each side rail is cut away as shown in FIG. 3 to accommodate the ends of the drum 30, and brackets 46 of the framework 24, between which the drum 30 is suspended, are pivotally attached to the rails 44 by means of a shaft 48 that extends between the brackets 46 and the rails 44. To allow each bracket 46 to be fixed at a given level, a screw clamp 50 passes through a slot 52 in each bracket, and engages a correspondingly threaded hole in the respective rail 44. Thus, to increase the pressure between the drive pulley 34 and the belt 4, each screw 50 may be loosened, the framework pressed downward, and the screws re-tightened.

The spacing of the drum 30 over the conveyor belt 4 can be altered by adjusting the mounting of the drum 30 in the framework 24. The drum 30 could of course be mounted in fixed bearings in the brackets 46, but in order to provide maximum scope for adjustment, a system is illustrated in FIG. 3 in which the drum 30 is supported on pulleys engaging its peripheral surface on either side of and below its axis, one of which pulleys is the reversing pulley 36 discussed above. An idler pulley 54 is mounted in each bracket 46 on the opposite side of the drum axis to the reversing pulley 36, and the distance of the reversing pulley 36 from the idle pulley 54 is made adjustable to raise or lower the drum 30. It is desirable in any event to arrange for the reversing pulley 36 to be resiliently urged against the drive pulley 34 and the drum 30 to ensure good driving engagement therebetween, and a resilient mechanism is indicated schematically at 58. The resilient force so generated is of course balanced by the weight of the drum 30, the stabiliser belt 26, and of course the movement of the conveyor belt 4 which is in frictional engagement with the stabiliser belt 26 over the overlaying section 38.

In order to ensure that the stabiliser belt 26 is driven at substantially the same speed as the periphery of the drum 30, and therefore as the conveyor belt 4, a gripping roller or rollers 60 may he used. The roller or rollers 60 are mounted at the distal ends of arms 62 pivotally mounted on the shaft 48. The arms 62 are contiuously urges by spring means such as torque springs (not shown) in an anti-clockwise direction as shown, about the shaft 48 to urge the roller or rollers 60 against the stabiliser belt 26 to preserve and maintain contact between the belt 26 and the drum 30.

The embodiment of the invention described above is given by way of example only, and numerous variations can be made within the spirit and scope of the invention disclosed herein.

We claim:

1. A stabiliser unit for stabilizing material on a moving conveyor, said conveyor having opposed material contacting and non-contacting surfaces, comprising a framework mountable over the conveyor and having a drive pulley drivingly engageable with the material contacting surface; a drum rotatably supported in the framework and carrying a stabiliser belt; means coupling the drive pulley to the drum to rotate the drum with its peripheral velocity substantially equal to that of the drive pulley, the stabiliser belt following a path with a first section capable of overlaying the conveyor, a second section in engagement with a segment of the drum surface, and third and fourth sections extending between the drum surface and the first section, whereby movement of the conveyor rotates the drive pulley and thereby the drum to advance the stabiliser belt around its path at a velocity substantially equal to the velocity of the conveyor and stabilise material held between the stabiliser belt and the conveyor along the first section of the path.

2. A stabiliser unit according to claim 1 wherein the coupling means comprises a reversing pulley interposed between the drive pulley and the drum.

3. A stabiliser unit according to claim 1 or claim 2 wherein the drum is mounted for rotation about a fixed axis in the framework.

4. A stabiliser unit according to claim 1 including means for holding the stabiliser belt against the drum as the drum is driven.

5. A stabiliser unit according to claim 1 wherein the drum includes a pair of flanges between which the stabiliser belt is carried, with the drive pulley and coupling means disposed outside of one of the flanges.

6. A stabiliser unit according to claim 1 wherein the framework comprises a pair of brackets between which the drum extends, one end of each bracket being pivotally supportable in a rail at either side of the conveyor, and the drive pulley being disposed at the other end of one of the brackets.

7. A stabiliser unit according to claim 6 including means for adjusting the angular position of each bracket.

8. A stabiliser unit according to claim 1 wherein the drum is removable mounted in the framework.

9. A stabiliser unit according to claim 1 wherein the conveyor is a conveyor belt.

10. A stabiliser unit for stabilizing material on a moving conveyor surface comprising a framework mountable over the surface and having a first and a second drive pulley drivingly engagable therewith; a drum rotatably supported in the framework and carrying a stabiliser belt; means coupling the drive pulleys to the drum interposed between the drive pulleys and the drum to rotate the drum with its peripheral velocity substantially equal to that of the drive pulleys, wherein the coupling means includes a first and a second reversing pulley in working engagement with said first and second drive pulleys, respectively, and disposed on either side of the framework and aligned with either end of the drum, with a first and a second idling pulley, respectively, mounted in the framework for rotatably supporting each end of the drum such that the disposition of the idling pulleys and the reversing pulleys determines the location of the rotational axis of the drum, and wherein the stabiliser belt follows a path with a first section capable of overlaying the conveyor surface, a second section in engagement with a segment of the drum surface, and third and fourth sections extending between the drum surface and the first section of the stabiliser belt, whereby movement of the conveyor surfacè rotates the drive pulleys and thereby the drum to advance the stabiliser belt around its path at a velocity substantially equal to the velocity of the conveyor surface and stabilise material held between the stabiliser belt and the conveyor surface along the first section of the path.

11. A stabiliser unit according to claim 10 including means for shifting the axis of the reversing pulleys to alter the location of the drum axis.

12. A stabiliser unit according to claim 10 including a resilient mechanism for urging the reversing pulleys against the drum and drive pulleys.

13. A stabiliser unit for mounting over a moving conveyor to stabilise material carried thereon, said conveyor having opposed material contacting and non-contacting surfaces, the unit comprising a framework supporting a drum having a first rotational axis; a drive pulley supported by the framework and having a second rotational axis spaced apart from the first rotational axis of the drum; and means coupling the drive pulley to the drum such that their peripheral velocities are substantially equal, the drum bearing a stabiliser surface to hold material against said conveyor as said conveyor moves relative to the stabiliser unit, and the drive pulley being adapted to engage said material contacting surface from above said conveyor and transmit drive therefrom to the drum to move the stabiliser surface in the same direction and at substantially the same velocity as said moving conveyor.

14. A stabiliser unit according to claim 13 further including means for mounting the framework in rails on either side of said conveyor surface, the mounting means defining a pivotal axis on one side of the drum axis, with the drive pulley disposed on the other side of the drum axis.

15. A stabiliser unit for mounting over a moving conveyor surface to stabilise material carried thereon, the unit comprising a framework supporting a drum having a stabiliser surface spaced from said conveyor surface to hold material thereagainst as said conveyor surface moves relative to the stabiliser unit when said stabilizer unit is mounted over said conveyor surface, the drum further includes a pair of flanges with the stabilizer surface disposed between said pair of flanges; a first and a second drive pulley adapted to engage said moving conveyor surface and transmit drive therefrom to the drum to move the stabiliser surface in the same direction and at substantially the same velocity as said moving conveyor surface where the stabiliser surface approaches same; and means coupling the drive pulleys to the drum such that the peripheral velocities of the drive pulleys and the drum are substantially equal, wherein the coupling means includes a first and a second reversing pulley in working engagement with said first and second drive pulley, respectively, and disposed on either side of the framework and aligned with either end of the drum outside of the flanges, with a first and a second idling pulley, respectively, mounted in the framework for rotatably supporting each end of the drum such that the disposition of the idling pulleys and the reversing pulleys determines the location of the rotational axis of the drum.

16. Sorting apparatus comprising a conveyor, said conveyor having opposed material contacting and non-contacting surfaces; means for delivering material to be sorted to an upstream section of the conveyor, a sorting mechanism at a downstream section of the conveyor; and a stabilising unit for material on the conveyor and disposed at an intermediate section of the conveyor, the stabilising unit comprising a framework mounted over the conveyor and having a drive pulley making driving engagement with the material contacting surface wherein said drive pulley has a first rotational axis; a drum rotatably supported in the framework and bearing a stabiliser surface and having a second rotational axis spaced apart from the first rotational axis of the drive pulley; means coupling the drive pulley to the drum to rotate the drum with its peripheral velocity substantially equal to that of the drive pulley, whereby movement of the conveyor rotates the drive pulley and thereby the drum to advance the stabiliser surface at a velocity substantially equal to the speed of the conveyor and stabilise material held between the stabiliser surface and the conveyor.

17. Apparatus according to claim 16 wherein the stabiliser surface comprises a belt carried on the drum and following a path with a first section overlaying the conveyer, a second section in engagement with a segment of the drum surface, and third and fourth sections extending between the drum surface and the respective points of separation of the stabiliser belt from the conveyer.

18. Apparatus according to claim 16 wherein the conveyer is a conveyer belt.

19. Apparatus according to claim 18 wherein the framework of the stabilising unit comprises a pair of brackets between which the drum extends, one end of each bracket being pivotally supported in a rail at either side of the conveyer belt, and the drive pulley being disposed at the other end of one of the brackets.

20. Apparatus according to claim 16 wherein the delivering means comprises a vibratory feed mechanism.

21. A method of stabilising material on a moving conveyor having opposed material contacting and non-contacting surfaces, comprising:

rotating a drive pulley about a first rotational axis by contacting the periphery of the drive pulley with the material contacting surface from above the conveyor so that the speed of the drive pulley periphery is substantially the same as the speed of the moving conveyor;

rotating a drum about a second rotational axis non-coaxial with said first rotational axis by coupling the rotational movement of the drive pulley to the drum in a manner that the peripheral speed of the drum is substantially the same as that of the drive pulley; and overlaying a stabiliser surface carried by said drum over said moving conveyor such that the stabiliser surface contacts and stabilises said material moving on the conveyor.

22. The method of claim 21, wherein the step of overlaying the stabiliser surface includes the steps of overlaying a belt carried on the drum and maintaining said belt against the material moving on the conveyor.

23. The method of claim 22, wherein the step of overlaying said belt includes the step of moving the belt about a path having a first section overlaying the conveyor, a second section in engagement with a segment of the drum surface, and third and fourth sections extending between the drum surface and the first section.

24. The method of claim 21, wherein the step of coupling the rotational movement of the drive pulley to said drum includes the steps of:

coupling the rotational movement of the drive pulley to a reversing pulley such that the reversing pulley rotates about a third rotational axis non-coaxial with both said first and second rotational axis and such that the peripheral speed of the reversing pulley is substantially the same as that of the drive pulley, but in a reverse direction; and coupling the rotational movement of the reversing pulley to said drum such that the drum rotates about said second rotational axis.

* * * * *

UNITED STATES PATENT AND TRADEMARK OFFICE
CERTIFICATE OF CORRECTION

PATENT NO. : 5,626,219
DATED : May 6, 1997
INVENTOR(S) : Benedict M.M. Deefholts et al.

It is certified that error appears in the above-indentified patent and that said Letters Patent is hereby corrected as shown below:

In Column 3, Line 55 replace:
"delivery section 8 and the discharge end 14 of the conveyor,"

with
--delivery section 8 and the downstream end 10 of the conveyor--

Signed and Sealed this

Twenty-eighth Day of October, 1997

Attest:

BRUCE LEHMAN

Attesting Officer      Commissioner of Patents and Trademarks